United States Patent [19]

Nokubo et al.

[11] Patent Number: 5,465,937
[45] Date of Patent: Nov. 14, 1995

[54] FLUID PRESSURE CONTROL DEVICE

[75] Inventors: Seiji Nokubo; Teruhisa Kohno, both of Itami, Japan

[73] Assignee: Sumitomo Electric Industries, Ltd., Osaka, Japan

[21] Appl. No.: 245,629

[22] Filed: May 18, 1994

[30] Foreign Application Priority Data

May 21, 1993 [JP] Japan .................................. 5-119869

[51] Int. Cl.⁶ ................................................. F16K 31/06
[52] U.S. Cl. ................ 251/129.15; 137/315; 137/454.2; 251/30.01
[58] Field of Search ................................ 137/315, 454.2; 251/30.01, 129.15

[56] References Cited

U.S. PATENT DOCUMENTS 4,257,573  3/1981  Stampfli ........................ 251/30.01
4,903,944  2/1990  Butzen ......................... 137/454.2 X
5,102,096  4/1992  Siegel et al. .

FOREIGN PATENT DOCUMENTS 1915756  3/1965  Germany .
 939356  10/1963  United Kingdom .
1230857  5/1971  United Kingdom .

*Primary Examiner*—Robert G. Nilson
*Attorney, Agent, or Firm*—Wenderoth, Lind & Ponack

[57] ABSTRACT

A fluid pressure control device having a housing formed with a bore and a solenoid valve mounted in the bore. The solenoid valve has a frame of a magnetic material mounted in the bore. The frame and thus the solenoid valve are mounted in the bore of the housing and secured in position by a pin received in a hole formed in the frame and supported by the housing. This eliminates a seating plate for securing the solenoid valve against the housing. This contributes to a compact design, light weight and lower manufacturing cost.

12 Claims, 4 Drawing Sheets

FLUID PRESSURE CONTROL DEVICE

BACKGROUND OF THE INVENTION

The present invention relates to a fluid pressure control device in which a solenoid valve is fixed to a housing with a simple structure and which is lightweight and can be manufactured at low cost.

FIG. 5 shows a conventional fluid pressure control device including a solenoid valve designated by numeral 1 in the figure. The solenoid valve 1 has a solenoid coil 2 and a frame 3 made of a magnetic material to function as a magnetic circuit. In the frame 3 is provided a fixed valve seat 4. By activating the solenoid coil 2, an armature 5, which is biased by a spring 6, is pulled by the magnetic force of the coil 2, so that a valve body 7 at the front end of the armature 5 moves away from the fixed valve seat 4. In this state, a fluid chamber 9 defined in front of the frame 3 communicates through a passage 8 with a fluid passage 11 (which is a discharge passage in this example).

A changeover valve 12 is mounted, together with the frame 3 of magnetic material, in a bore formed in a housing 10. This changeover valve comprises a sleeve 12b and a spool 12a. The spool 12a has a fluid passage having an orifice and moves in the sleeve 12b to a point at which the pressures acting on both ends thereof balance, thereby changing over the state of fluid communication between an inlet leading to a pressure source (not shown) and first and second outlets leading to wheel brakes. This type of changeover valve is well-known in the art. It is not important in the present invention whether or not the device includes such a changeover valve. Thus, its detailed description is omitted here.

The point is that, irrespective of whether the device includes the changeover valve 12 or not, the solenoid valve 1 shows a stronger tendency to come out of the bore in the housing as the fluid pressure in the fluid chamber 9 increases.

Thus, the device of FIG. 5 is provided with a seating plate 13 bolted to the housing 10 to prevent the solenoid valve 1 from coming out of the bore.

Unexamined Japanese Patent Publication 4-228985 discloses other ways to retain the solenoid valve in a fixed position. In one embodiment, a frame of a magnetic material has a flange which is bayonet-fitted in a groove having a larger diameter than an inlet formed by recessing the opening of the bore. In another embodiment, both the frame and the bore are threaded to keep them in threaded engagement with each other.

A fluid pressure control device for use in vehicle antilock or anti-spin control is required to be as small in size, lightweight and low-cost as possible. The device of FIG. 5 does not satisfy these requirements because it requires the seating plate 13 and the bolts for retaining the plate.

The device disclosed in Unexamined Japanese Patent Publication 4-228985 or the device in which the solenoid valve is screwed into the housing is high in manufacturing cost and low in mass-productivity.

SUMMARY OF THE INVENTION

An object of the present invention is to provide a fluid pressure control device which is free of these problems.

In order to attain this object, according to the present invention, a frame of a solenoid valve inserted in a bore of a housing is formed with a recess or hole into which a pin extending through the housing is inserted. The solenoid valve is fixed to the housing by means of the pin.

The pin used may be a solid pin or a hollow pin. If a hollow pin is used, the bore in the pin is used as a fluid passage. If a solid pin is used, the gap between the pin hole formed in the housing and the outer periphery of the pin is used as the fluid passage.

The housing may be partially caulked to secure the solenoid valve to the housing as an auxiliary means for fixing the solenoid valve.

The recess or hole for receiving the pin can be easily formed by an ordinary machining technique. Simply by inserting the pin into the recess or hole thus formed and holding it in position so as not to come out of the recess or hole, it is possible to eliminate the need to provide the frame with a flange having a special shape, to form threads on both the frame and the bore, and to hold the solenoid valve with a seating plate. The object of the present invention is thus attained.

According to the present invention, since the solenoid valve is secured to the housing by means of a pin, no complicated fixing structure is necessary. It is possible to eliminate the need of providing a seating plate, which was a major cause of increased size and weight of the entire device. The fluid pressure control device of the present invention is thus compact in size and lightweight and can be mass-produced efficiently at a low cost.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
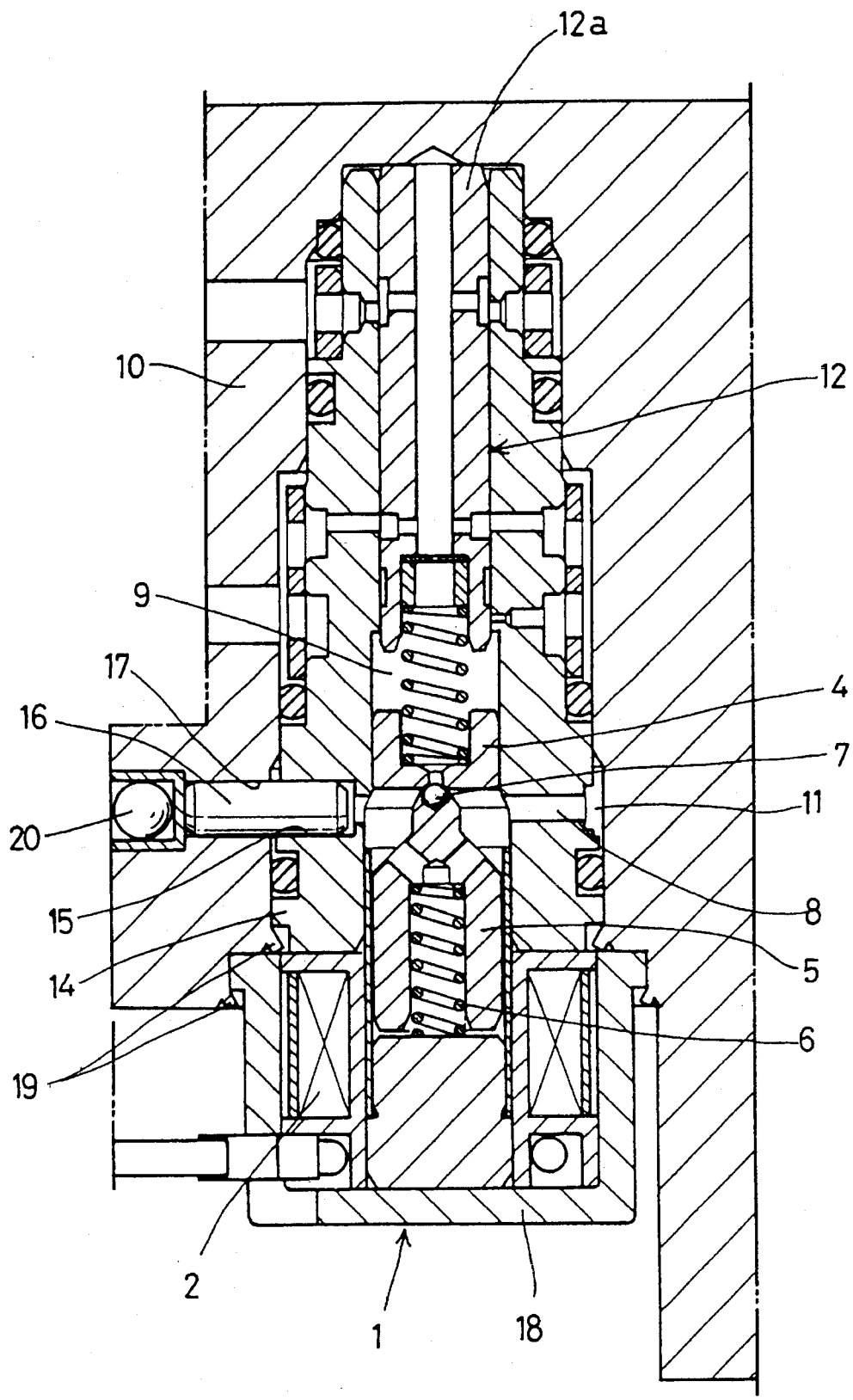
FIG. 1 is a sectional view showing one embodiment of the fluid pressure control device according to the present invention.
Figure 5:
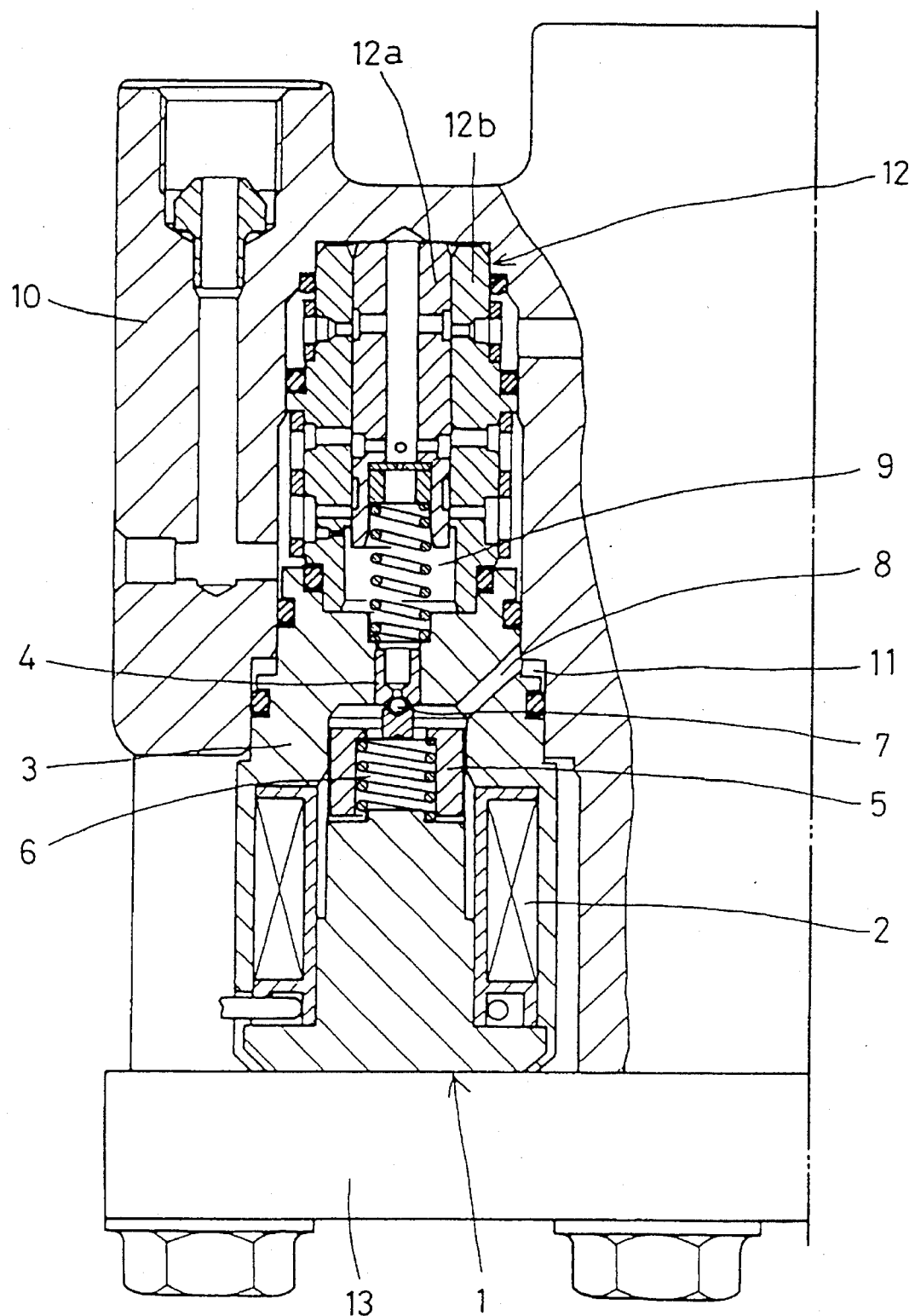
FIG. 5 is a sectional view of a conventional fluid pressure control device.

FIG. 1 shows one embodiment of the fluid pressure control device according to the present invention. This device has a solenoid valve 1 combined with a changeover valve 12. In this embodiment, the magnetic material frame 3 and the sleeve 12b of FIG. 5 are replaced with an integral cylindrical sleeve or frame 14. After inserting the sleeve 14 into a bore of the housing 10, a pin 16 is inserted into a space formed as a hole 15 in the outer periphery of the sleeve 14. The pin is perpendicular to the bore of the housing. It partially fits in a pin hole 17 radially formed in the housing 10. The sleeve 14, the solenoid coil 2 and iron core of the solenoid valve, and an end frame 18 are fixedly coupled together. Thus, by inserting the pin 16 as shown, the solenoid valve 1 and the changeover valve 12 are securely fixed to the housing 10.

The housing 10 of this device is caulked at the opening of the bore (as shown at 19 in the figure) so as to engage the peripheral edge of rear end of the sleeve 14. The sleeve 14 is temporarily fixed in position by caulking after being inserted in the bore. This facilitates the subsequent work for inserting the pin 16.

Numeral 20 in the figure indicates an end plug by which the pin hole 17 is liquid-tightly sealed.

Figure 2:
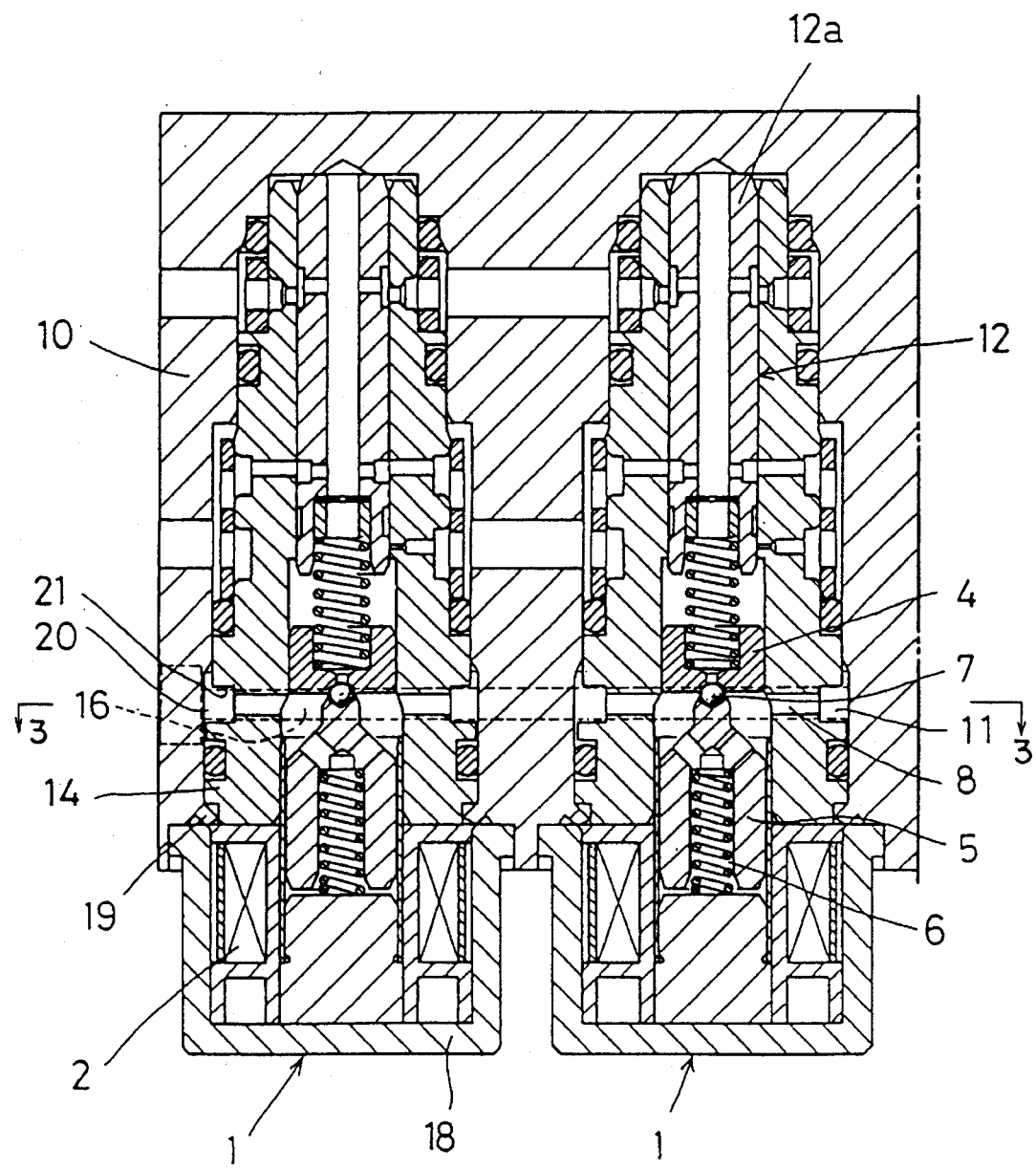
FIG. 2 is a sectional view of another embodiment.
Figure 3:
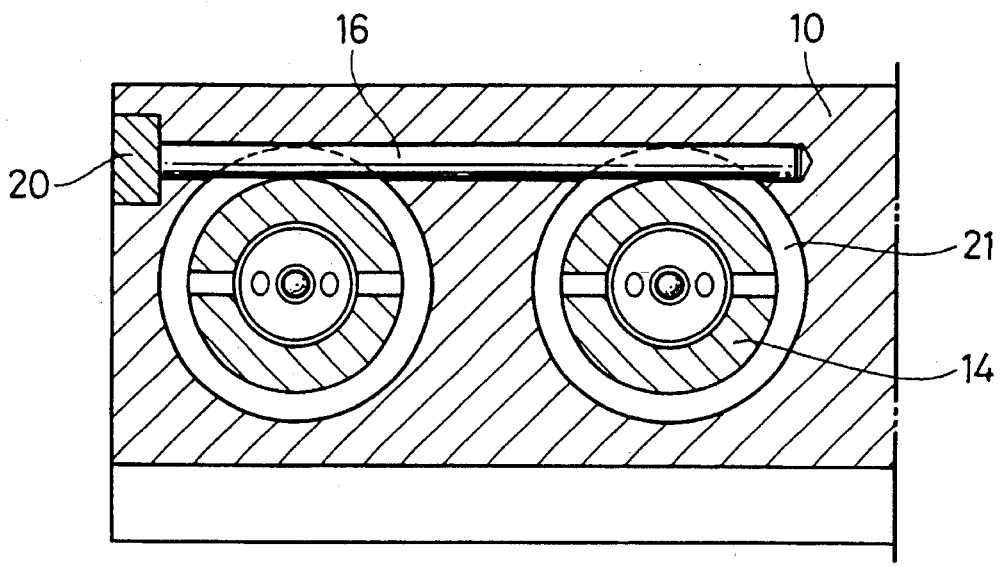
FIG. 3 is a sectional view taken along line 3—3 of FIG. 2.

FIGS. 2 and 3 show another embodiment. As shown, a plurality of sets of solenoid valves 1 and changeover valves 12 may be mounted in a single housing. In this arrangement, it is not desirable for workability and machinability to fix the respective solenoid valves with separate pins. Thus, in this embodiment, a single long pin 16 is inserted in a space formed as annular grooves 21 in the outer periphery of the sleeves 14 to fix the plurality of solenoid valves 1 to the housing 10 with the single pin 16.

Figure 4A:
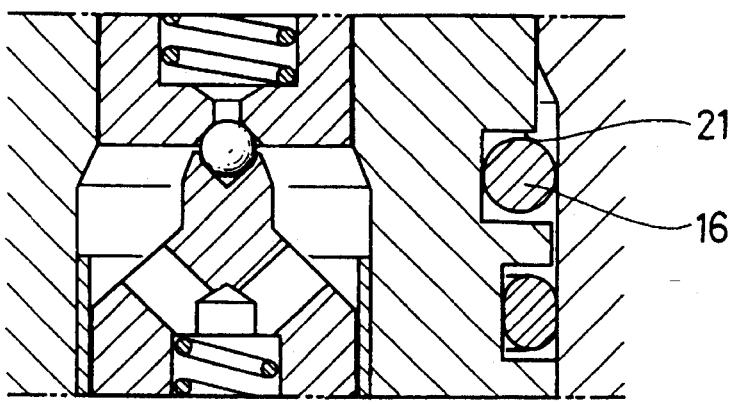
FIGS. 4A and 4B are views showing the sectional shape of one embodiment of a pin.
Figure 4B:
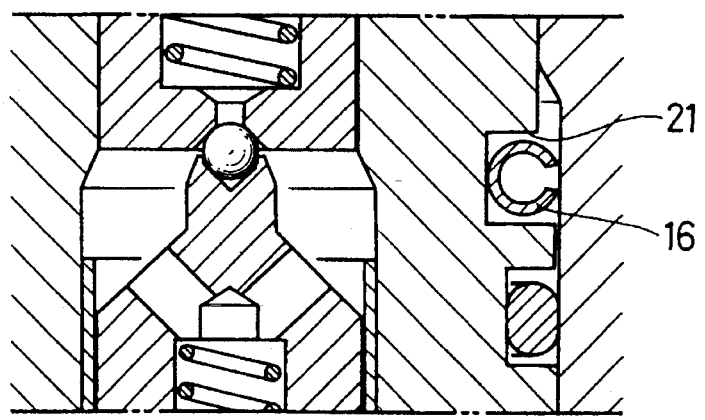

The pin 16 may be a solid pin as shown in FIG. 4A but is preferably a hollow pin as shown in FIG. 4B (which shows a spring pin) because, with the hollow pin, fluid can flow through the pin, and thus it is possible to use the pin holes 17 as a fluid passage. Even if a solid pin is used, it is possible to provide such a fluid passage by forming a suitable gap between the pin hole formed in the housing and the outer periphery of the pin. A fluid passage is thus provided by the hollow pin or gap around the pin, the annular groove 21 or fluid passage 11, and the hole 8, the fluid passage thus communicating with the valve portion of the solenoid valve (armature 5, valve body 7 and valve seat 4) to be opened and closed thereby.

What is claimed is:

1. A fluid pressure control device, comprising:
   a housing having a bore therein having one end open and a pin hole in said housing opening onto said bore;
   a solenoid valve disposed in said housing, said solenoid valve comprising a frame and a valve portion provided in said frame, wherein said frame is mounted in said bore such that said frame forms a liquid tight seal of said open end of said bore in said housing, said frame has a space defined therein communicating with said pin hole of said housing, and said frame has a hole formed therein communicating said valve portion in said frame with said pin hole of said housing;
   a pin supported by said housing in said pin hole, said pin extending from said pin hole into said space in said frame such that said solenoid valve is retained in said housing; and
   a gap in said pin hole defined by said pin hole around said pin therein, said gap communicating with said hole of said frame such that said gap and said hole of said frame together define a fluid passage, said fluid passage being openable and closeable by said valve portion of said solenoid valve.

2. The device of claim 1, wherein said solenoid valve is fixed to said housing by a portion of said housing being deformed to hold said solenoid valve.

3. The device of claim 1, wherein said frame of said solenoid valve comprises a sleeve having a spool valve therein, said sleeve having an end frame connected thereto, and said valve portion of said solenoid valve comprises a valve seat fixed in said sleeve, an armature having a valve body connected therewith for engagement with said valve seat and a coil disposed in said end frame, said fluid passage communicating with said spool valve in an open position of said valve body.

4. The device of claim 1, wherein said space in said frame is an annular groove around the outside of said frame and said hole in said frame extends radially from an interior portion of said frame communicating with said valve portion to said annular groove.

5. The device of claim 1, wherein said space in said frame is a radial bore aligned with said pin hole in said housing, and said hole in said frame extends radially from an interior portion of said frame communicating with said valve portion.

6. The device of claim 5, wherein said fluid passage further comprises an annular passage in said bore communicating with said hole in said frame and said pin hole.

7. A fluid pressure control device, comprising:
   a housing having a bore therein having one end open and a pin hole in said housing opening onto said bore;
   a solenoid valve disposed in said housing, said solenoid valve comprising a frame and a valve portion provided in said frame, wherein said frame is mounted in said bore such that said frame forms a liquid tight seal of said open end of said bore in said housing, said frame has a space defined therein communicating with said pin hole of said housing, and said frame has a hole formed therein communicating said valve portion in said frame with said pin hole of said housing;
   a pin supported by said housing in said pin hole, said pin extending from said pin hole into said space in said frame such that said solenoid valve is retained in said housing; and
   a hollow space in said pin, said pin communicating with said hole of said frame such that said hollow space and said hole of said frame together define a fluid passage, said fluid passage being openable and closeable by said valve portion of said solenoid valve.

8. The device of claim 7, wherein said solenoid valve is fixed to said housing by a portion of said housing being deformed to hold said solenoid valve.

9. The device of claim 7, wherein said frame of said solenoid valve comprises a sleeve having a spool valve therein, said sleeve having an end frame connected thereto, and said valve portion of said solenoid valve comprises a valve seat fixed in said sleeve, an armature having a valve body connected therewith for engagement with said valve seat and a coil disposed in said end frame, said fluid passage communicating with said spool valve in an open position of said valve body.

10. The device of claim 7, wherein said space in said frame is an annular groove around the outside of said frame and said hole in said frame extends radially from an interior portion of said frame communicating with said valve portion to said annular groove.

11. The device of claim 7, wherein said space in said frame is a radial bore aligned with said pin hole in said housing, and said hole in said frame extends radially from an interior portion of said frame communicating with said valve portion.

12. The device of claim 11, wherein said fluid passage further comprises an annular passage in said bore communicating with said hole in said frame and said pin hole.

* * * * *